US012647708B2

(12) United States Patent
Birkeland et al.

(10) Patent No.: US 12,647,708 B2
(45) Date of Patent: Jun. 2, 2026

(54) AUDIO SYSTEM FOR MRI

(71) Applicant: NORDICNEUROLAB AS, Bergen (NO)

(72) Inventors: Olav Birkeland, Rådal (NO); Nikolai Kalvenes, Bergen (NO)

(73) Assignee: NORDICNEUROLAB AS, Bergen (NO)

( * ) Notice: Subject to any disclaimer, the term of this patent is extended or adjusted under 35 U.S.C. 154(b) by 185 days.

(21) Appl. No.: 18/716,834

(22) PCT Filed: Oct. 26, 2022

(86) PCT No.: PCT/NO2022/050245

§ 371 (c)(1),
(2) Date: Jun. 5, 2024

(87) PCT Pub. No.: WO2023/106924

PCT Pub. Date: Jun. 15, 2023

(65) Prior Publication Data

US 2025/0039586 A1 Jan. 30, 2025

(30) Foreign Application Priority Data

Dec. 8, 2021 (NO) .................................... 20211478

(51) Int. Cl.
*H04R 5/033* (2006.01)
*H04R 1/02* (2006.01)
*H04R 1/08* (2006.01)
*H04R 1/10* (2006.01)

(52) U.S. Cl.
CPC ............. *H04R 1/028* (2013.01); *H04R 1/083* (2013.01); *H04R 1/1008* (2013.01); *H04R 2201/003* (2013.01); *H04R 2420/07* (2013.01)

(58) Field of Classification Search
CPC ...... H04R 1/10; H04R 1/1008; H04R 1/1033; H04R 1/1075; H04R 3/12; H04R 5/033; H04R 5/04; H04R 19/005; H04R 5/554; H04R 2201/02; H04R 2201/10; H04R 2201/107; H04R 2201/003; H04R 2225/49; H04R 2420/03; H04R 2420/0922
See application file for complete search history.

(56) References Cited

U.S. PATENT DOCUMENTS 7,867,160 B2 * 1/2011 Pluvinage ............ H04R 25/554 600/25
10,247,791 B2 * 4/2019 Ropella ................ G01R 33/283
11,827,511 B2 * 11/2023 Loeppert ............... B81B 3/0059
2013/0311176 A1 * 11/2013 Brown ................ H04R 1/1016 381/74
2021/0384934 A1 * 12/2021 Zhu .......................... H04R 1/10

FOREIGN PATENT DOCUMENTS

KR 101118547 B1 * 2/2012 .............. A61F 11/14
KR 20140125969 A * 10/2014 ....... G10K 11/17881

* cited by examiner

*Primary Examiner* — Ryan Robinson
(74) *Attorney, Agent, or Firm* — Maschoff Brennan

(57) ABSTRACT

The present invention describes an audio system, and its components and/or units, configured for use during operation of a magnetic resonance imaging (MRI) device. Furthermore, a set of headphones (4) is configured for use in the MRI audio system and for use by a patient (8) to be subject to an MRI examination, wherein the headphones (4) comprise an array of MEMS speaker elements (22) placed in parallel and arranged within a cup (26) of the headphones (4).

10 Claims, 4 Drawing Sheets

AUDIO SYSTEM FOR MRI

TECHNICAL FIELD

The invention relates to an audio system, and its components and/or units, for use during operation of a magnetic resonance imaging (MRI) device.

BACKGROUND OF THE INVENTION

In the medical field, magnetic resonance imaging (MRI) is a commonly used non-invasive technique to diagnose a medical condition of a patient. And in functional MRI (fMRI), an MRI scanner is used to measure brain activity, thus providing maps of important functional regions of the brain. Functional MRI (fMRI) is used clinically to plan brain surgery and researchers and/or scientists use fMRI to study the brain physiology, to evaluate drug effectiveness and to understand the brain and brain diseases, such as mental illness, with the hope of transition into clinical use in the future. Typically, an MRI system operator places the patient within an MRI magnet bore of large homogeneous magnetic field and the MRI system subjects the patient to a set of gradient magnetic fields and radiofrequency (RF) pulses. The MRI system measures the very small RF signals emitted from nuclei in the patient and processes the information to reconstruct an image of a part of the patient's body in the MRI system. The MRI generates high energy pulses in the frequency range from 50 MHz to 300 MHz. The frequency depends on the strong fixed magnetic field and the magnetic gradient fields.

The MRI magnet bore is small, especially in the head coil, and can induce claustrophobic feelings in many patients. The MRI system produces loud noises as the MRI system changes the gradient magnetic fields. The noise levels during MRI examinations can reach levels above 110-130 dB due to current variations in the gradient coils. These loud noises can lead to significant challenges in patient-operator communication as well as to increased patient anxiety and discomfort. These noise levels can even be harmful to the patient undergoing the MRI scanning. Under these conditions, up to 20% of patients do not remain sufficiently still during the 20-to-60-minute process for a successful MRI image. As many patients commonly become distressed by the noise they often must be sedated or anaesthetized. However, sedation is not suitable where interactive brain function is to be studied. As it is known in the art, the MRI system operator may reduce or eliminate the patient's claustrophobic feelings and anxiety by providing the patient with sufficient guidance and communication and even some type of entertainment.

The MRI scanner is a very strong magnet that is always on. Ferromagnetic and/or metallic objects will be pulled into the MRI magnet bore and if the mass of the object is significant this can lead to severe or even fatal accidents.

The MRI scanner is also a very strong radio transmitter that may damage or make unshielded electronics fail. There is also a possibility for generating standing waves. This can lead to heat buildup and can lead to powerful electric discharges to the person touching it.

Furthermore, the MRI scanner is a very sensitive receiver for radiofrequency (RF) signals. All digital electronics radiates RF and may degrade or even destroy the MR (magnetic resonance) images.

The MRI scanner uses the signal from the nuclei in hydrogen atoms to generate images. Any material close to the patient which contains hydrogen risks being interpreted as part of the patient. Some materials might also block the RF signals needed to construct the MR image resulting in degraded image quality. In addition, many conventional materials create magnetic field distortion and artifacts. The materials must therefore be carefully selected and tested to not affect the quality of the MR image.

Materials used in contact with a patient must be certified according to biocompatibility standards. In addition, the materials must withstand cleaning and disinfecting agents and/or have the possibility for replaceable hygienic covers. The materials must also be comfortable towards the patient's head and ears and not introduce pressure points potentially increasing pain and anxiety. Combining all these material requirements makes the design of products in an MRI environment particularly challenging.

Noise cancelation has initially been used in e.g. vehicles and/or airplanes to attenuate undesired noise, and headphones for travelers. However, all these devices require a microphone or an accelerometer in-situ to capture sound waves and to convert them to an electrical signal that can be processed to produce a noise cancelling signal. In addition, electrodynamic loudspeakers (the traditional speakers used everywhere) have an internal magnet which will pose a risk in the MRI scanner. Also, it will not work as intended when submitted to the strong external magnetic field in the MRI magnet bore. Such devices are thus not suitable for MRI scanners/devices/machines, because of the metallic or semiconductor content which would risk over-heating or worse as a result of the fluctuating high magnetic fields encountered in such MRI scanners/devices/machines.

Conventional headphones with good passive noise attenuation are simply too thick (30-50 mm) to fit into the head coils used for neuro/brain imaging. In order to fit into commonly used head coils, such as e.g. the Siemens 64 and 32 channel, the compressed build width (i.e. the thickness of each earmuff of the headphones) should not exceed 15 mm.

There are several critical areas that must be addressed when subjecting a patient to an MRI scan. First, the strong fields generated by the MRI device must not prevent the normal operation of an MRI audio system. Second, the large RF pulses from the MRI system must not harm or heat up the MRI audio system. Third, the MRI audio system must not emit sufficient RF energy to degrade the MRI image quality. Fourth, the Faraday shield used to contain the MRI audio system's RF signals must not produce anomalies in the MRI image. Fifth, some components, such as headphones, etc., of the MRI audio system must fit within the MRI system and comfortably accommodate a wide range of patients. Sixth, the MRI audio system must be affordable, reliable and easy to use.

Therefore, an improved MRI audio system is desired. The present invention attempts to solve these problems and others by providing a new and improved MRI audio system.

SUMMARY OF THE INVENTION

It is an object of the present invention to provide an improved MRI audio system as well as an improved set of headphones for use during a magnetic resonance imaging (MRI) examination, where such materials and components, e.g. based on non-magnetic MEMS technology, will be used therein that they will not, in any way or manner, contribute for degrading or even destroying any MR (magnetic resonance) image.

It is another object of the invention to provide an improved MRI audio system for use during MRI scanning, wherein the MRI audio system is regulatory approved for clinical and research MRI use. It is also intended that the improved MRI audio system will provide ease of use and comfort, head-coil compatibility, adequate noise attenuation and sound quality, system stability and reliability as well as attractive initial price and low maintenance costs.

Yet another object of the invention is to provide improved headphones for the MRI audio system thus providing required noise attenuation, avoiding use of additional ear plugs and having compact design allowing for fit with common head coils used for neuro/brain MRI scans.

Yet another object of the invention is to provide an audio system which allows for integration with MRI scanner OEM system allowing for use of auto-voice functionality and patient alarms.

The main features of this invention are given in the independent claims. Additional features of the present invention are given in the dependent claims.

The present invention concerns an audio system configured for magnetic resonance imaging (MRI). The MRI audio system comprises: at least one audio source placed in a control room; a control room interface unit placed in the control room and configured for wireless and/or cabled interconnection and communication with said at least one audio source; a magnetic room interface unit placed in a magnetic room, the entire magnetic room being shielded by a metal shield arranged inside the magnetic room; an optical cable comprising at least one optical fiber and arranged within a waveguide having a relatively small diameter compared to its length thus providing high attenuation for electromagnetic waves, wherein the waveguide is connecting the magnetic room and the control room and comprises said at least one optical fiber of the optical cable, and wherein the optical cable connects the control room interface unit and magnetic room interface unit in such a manner that the metal shield of the magnetic room will not be penetrated; a shielded box; and a set of headphones configured for use by a patient to be subject to an MRI examination. The shielded box is connected to the headphones via a shielded cable configured for transfer of signaling between the shielded box and the headphones. The shielded box comprises at least one battery for supplying energy to the headphones via the shielded cable. The magnetic room interface unit is interconnected with the shielded box for mutual communication by means of at least one of: wireless communication via an RF antenna of the magnetic room interface unit and an RF antenna of the shielded box and/or an optical cable connecting the magnetic room interface unit and the shielded box. The headphones comprise an array of non-magnetic MEMS speaker elements placed in parallel and arranged within a cup of the headphones.

The headphones can further comprise at least one MEMS microphone positioned inside the cup in proximity to the patient's mouth.

The headphones of the MRI audio system can further comprise: a feedforward (FF) microphone/mic and a feedback (FB) microphone/mic. The FF mic can be placed on the outside of the headphones and positioned not to be obstructed by the head coil. The FF mic can also be configured to record the surrounding noise in the MR room. The FB mic can be arranged inside an earmuff of the headphones and close to the patient's ear. The FB mic can also be configured for recording the sound presented to and/or heard by the patient.

The control room interface unit can be interconnected with said at least one audio source for mutual communication by means of at least one of: wireless communication via an RF antenna of the control room interface unit and/or wired connection by means of a cable connecting the control room interface unit and said at least one audio source.

The wireless communication between the control room interface unit and said at least one audio source can be wireless communication via at least one wireless transceiver.

The magnetic room interface unit can further comprise a charging unit configured for charging said at least one battery of the shielded box for supplying energy to the headphones. Said at least one battery can be rechargeable.

The metal shield arranged inside the magnetic room can be a Faraday cage.

The present invention concerns also a set of headphones configured for use in a magnetic resonance imaging (MRI) audio system and for use by a patient to be subject to a magnetic resonance imaging (MRI) examination. The headphones comprise an array of MEMS speaker elements placed in parallel and arranged within a cup of the headphones.

The set of headphones can further comprise at least one MEMS microphone for patient voice positioned inside the cup in proximity to the patient's mouth. The headphones can comprise a feedforward microphone positioned so that it is not obstructed by the head coil and able to record the noise in the MR room. The headphones can further comprise a feedback microphone recording the sound presented to the patient and positioned inside an earmuff.

The headphones can be over-ear or circumaural headphones.

BRIEF DESCRIPTION OF THE DRAWINGS

These and other aspects of the invention are apparent from and will be further elucidated, by way of example(s), with reference to the drawings, wherein.

DETAILED DESCRIPTION OF THE EMBODIMENTS

Microelectromechanical system (MEMS) is a manufacturing technology where modified semiconductor manufacturing techniques are used for making micro-mechanical parts. MEMS technology has been around for some years and MEMS microphones are widely used today. MEMS loudspeakers, on the other hand, are a new technology that became available just a few years ago. The underlying technology is based on the inverse piezoelectric effect. Unlike the piezoelectric loudspeaker, the MEMS loudspeaker has rich loud audio and a wide frequency response from 20 Hz to 20 kHz. The resonant frequency for these loudspeakers is close to or above 20 KHz. This is an improvement over traditional loudspeakers that have a resonance below 20 KHz. It is believed that the MEMS loudspeakers can replace electrodynamic loudspeakers in many markets. MEMS elements are mounted using automatic processes. They do not need tuning/matching. They are small, robust and they use very little power.

The present invention concerns an MRI audio system and its components and/or units, wherein the MRI system is based on non-magnetic MEMS components, such as MEMS microphones, MEMS loudspeakers and MEMS headphones.

Figure 1:
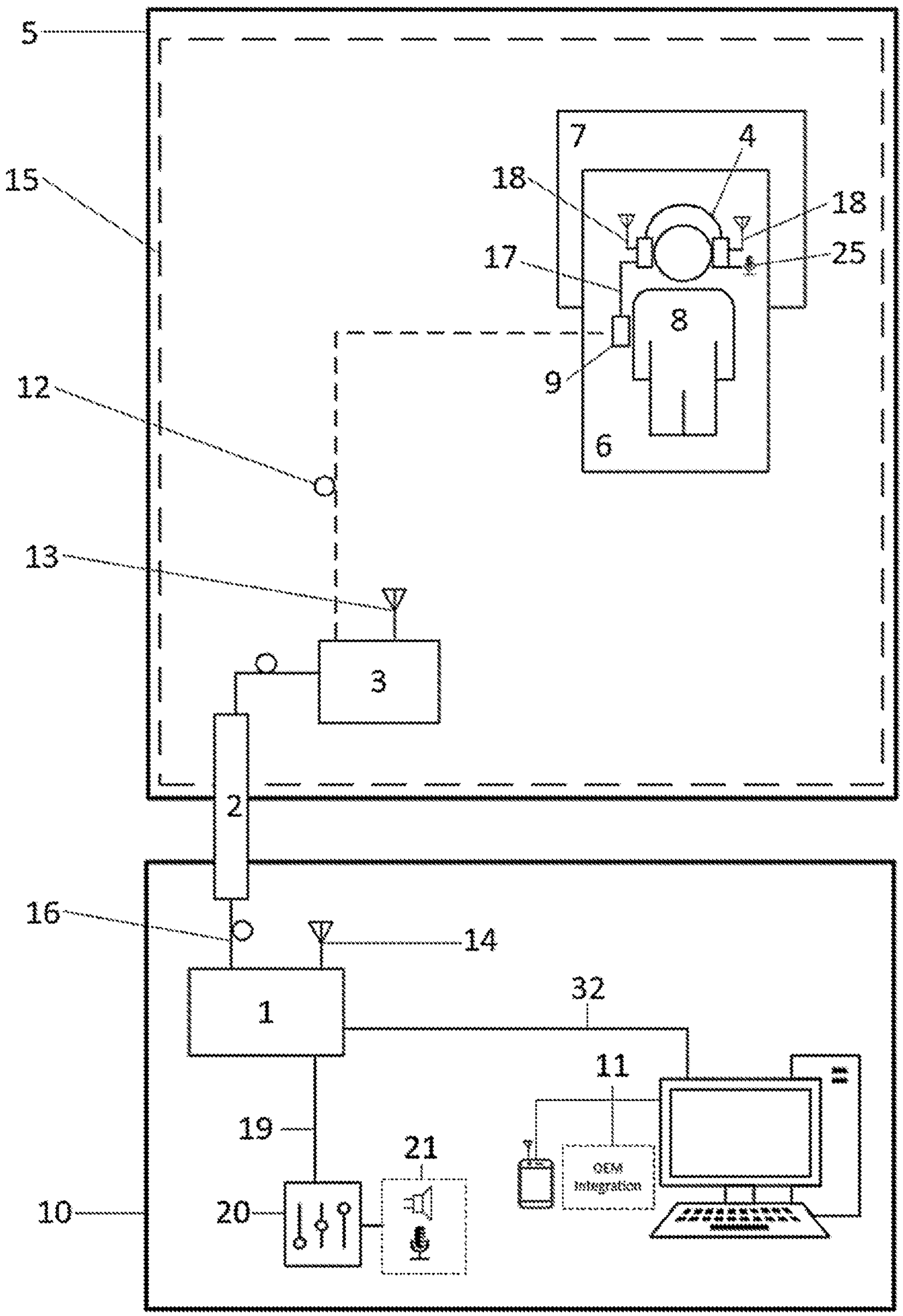
FIG. 1 shows an audio system for MRI according to the present invention.

FIG. 1 illustrates an MRI audio system according to the present invention. The MRI audio system comprises a control room interface unit (CRI) 1. The control room interface unit 1 is the interface between an end user's audio source(s) 11, such as e.g. a computer, a cell/mobile phone, a tablet and/or an iPad® and/or the like, and the optical signals to and from a magnetic room 5. The control room interface unit 1 is placed in a control room 10.

The control room interface unit 1 can comprise an RF antenna 14. The RF antenna 14 can be configured for connecting at least one audio source 11 (such as e.g., but not limited to a computer, a mobile phone, a tablet, an iPad®, etc.) to the MRI audio system (via the control room interface unit 1). Additionally or alternatively, said at least one audio source 11 can be connected to the control room interface unit 1 of the MRI audio system by means of a wired connection, such as e.g. a suitable cable 32. The radiographer is in the control room 10 during the MRI examination and will be able to communicate with a patient 8 that is to be examined via the MRI audio system.

The control room interface unit 1 will be connected using e.g. a USB or other suitable cable 19 to a physical control interface 20. The physical control interface consists of buttons, knobs and/or similar control for adjusting volume, push-to-talk, mute, etc. The control room interface unit 1 will also be connected to an external speaker and microphone interface 21, either as part of the physical control interface 20 or separately. Said external speaker and microphone interface 21 can be based on MEMS elements (e.g. microphone(s) and/or (loud) speaker(s)) if desired. These interfaces will facilitate two-way communication between the patient 8 and the operator, including operator control of the audio input and/or sound level.

The patient 8 is in the magnetic room 5 and is placed laid down on a patient bed 6 that is being moved into an MRI magnet bore 7 during the MRI examination. Inside the MRI magnet bore 7 the magnetic field strength can be of several Tesla. The entire magnetic room 5 is shielded by a metal shield 15 arranged inside the magnetic room 5. The metal shield 15 can for example be, but is not limited to, a Faraday cage.

The control room interface unit 1 placed or arranged in the control room 10 is connected, via an optical fiber cable 16, to components of the MRI audio system, particularly a magnetic room interface unit 3 thereof, placed or arranged in the magnetic room 5. The optical fiber cable 16 is arranged within a waveguide 2. The waveguide 2 is used for feeding the optical fiber cable 16 from the control room 10 into the magnetic room 5. The waveguide 2 can for example be a metal tube having a relatively small diameter compared to its length, thus giving a high attenuation for electromagnetic waves. Said waveguide 2, being a small diameter metal tube, can have a typical attenuation of e.g. about 100 dBm for electromagnetic waves in the frequency range used by the MR. All signaling from the control room interface unit 1 in the control room 10 to the magnetic room interface unit 3 in the magnetic room 5, and vice versa, goes over the optical fiber cable 16 through the waveguide 2 in order not to penetrate the Faraday cage shielding 15 of the magnetic room 5. The optical fiber cable 16 will carry control and audio signals.

The magnetic room interface unit 3 can comprise an RF antenna 13. The RF antenna 13 can be configured for connecting to a headphone set 4 of the MRI audio system via antenna(s) 18 thereof. The headphones 4 can be over-ear headphones. The headphones 4 can be wireless. Using at least one integrated microphone 25 the headphones 4 enable two-way communication between the patient 8 and the operator (not shown) during the MRI scanning. Said at least one integrated microphone 25 can be a MEMS microphone. Thus, the MRI audio system will allow auditory signals from the audio source(s) 11 (i.e. from the operator or the OEM system) in the control room 10 to enter the scanner or magnetic room 5 and to be presented to the patient 8.

The magnetic room interface unit 3 is responsible for wireless communication inside the shielded room 5. The magnetic room interface unit 3 can also be responsible for battery charging of the headphones 4.

Inside the magnetic room 5 the MRI audio system comprises also a shielded box 9. The shielded box 9 can be configured for keeping therein one or more batteries (not shown) that will supply energy to the headphones 4. Said one or more batteries can be rechargeable. The shielded box 9 can further be configured for serving as an interface for the optical and/or wireless audio signals. The shielded box 9 must be fully shielded. One or more cables 17 can interconnect the shielded box 9 and the headphones 4. The cable(s) 17 should be as short as possible. The cable(s) 17, from the shielded box 9 to the headphones 4, must also be fully shielded.

The headphones 4 have earmuffs connected to the shielded box 9 via the cable(s) 17. The earmuffs contain a circuit board 30 comprising speaker drivers and circuits for active noise cancellation (ANC). Antennas 18, e.g. at least one RF antenna, for receiving and sending audio wirelessly to and from the magnetic room interface unit 3, can be found inside the earmuffs. Audio RF transmissions to left and right earmuffs of the headphones 4 are isochronous from the magnetic room interface unit 3. Optionally cabled signaling can be performed via an optical fiber cable 12.

The optional optical fiber cable 12 can be used if wireless communication will not be desired by the end user (not shown) or if the wireless communication, via the RF antennas 13, 18, suddenly or unexpectedly or intentionally fails or is turned off. Optical fiber cables also give the option of transferring uncompressed audio and/or audio having a higher sampling rate end thereby higher fidelity and reduced latency.

Figure 2:
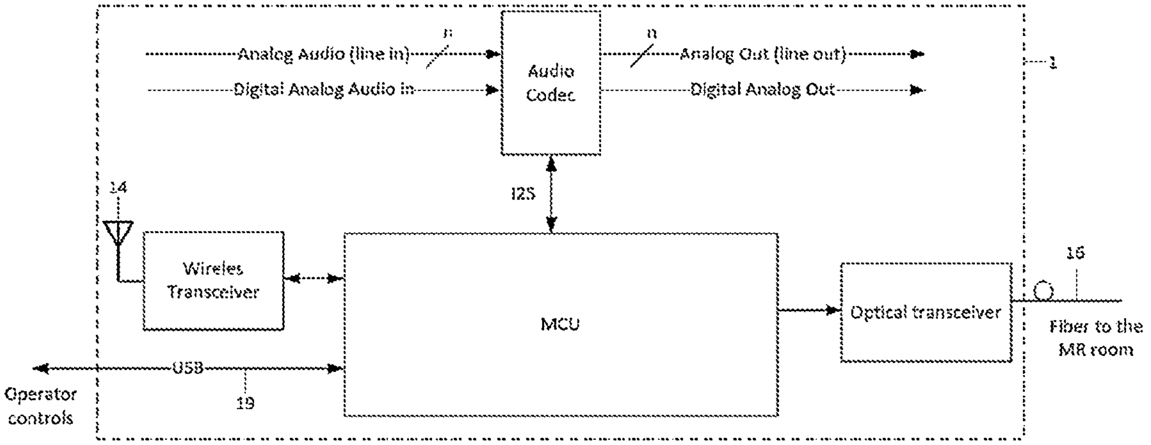
FIG. 2 shows a control room interface unit of the MRI audio system.

FIG. 2 illustrates in detail the control room interface unit 1 of the MRI audio system. The control room interface unit (CRI) 1 is used for interfacing the different audio sources 11. The purpose of this unit is to convert the signaling from the different audio sources 11 into an optical format that is to be sent via the fiber cable 16 into the magnetic room 5. In the other direction audio from the patient 8 will be sent back via the fiber cable 16 into the control room 10 and then made available to the operator via a loudspeaker of the speaker and microphone interface 21.

The control room interface unit 1 can comprise a wireless transceiver for easy connect to wireless devices (e.g. mobile phones, tablets, laptops, PCs, etc.) via the RF antenna 14. Via the USB interface 19 a connected PC will be able to see the control room interface unit 1 as an external speaker. Digital input and analog line-in audio interfaces can be needed for connecting to OEM (original equipment manufacturer) device(s) for routing auto-voice commands into the MRI audio system or to connect to other audio sources. Digital output and analog line-out audio interfaces can be used for routing the patient 8 voice into the OEM device/equipment and/or for connecting to other audio sinks. An audio codec can have a digital audio output interface to a microcontroller unit (MCU) that can select from any of the audio input interfaces, both analog and digital. The audio codec can have a digital audio input interface that can output an audio signal from the MCU to any of the audio output interfaces, both analog and digital. An optical transceiver can be connected to a serial interface on the microcontroller unit (MCU) to transfer control and audio data to the magnetic room interface unit 3 over the optical fiber cable 16 through the waveguide 2. This device 1 can have a digital (I2S/I2S=Inter-IC Sound/inter-integrated circuit sound) audio output that can be selected from any of several audio input streams, both analog and digital.

Auto-voice is automated voice commands used by the OEMs to instruct the patient 8 for example to lay still. The MRI audio system must preserve the auto-voice commands and be able to present them via the new headphones 4 to the patient 8.

Figure 3:
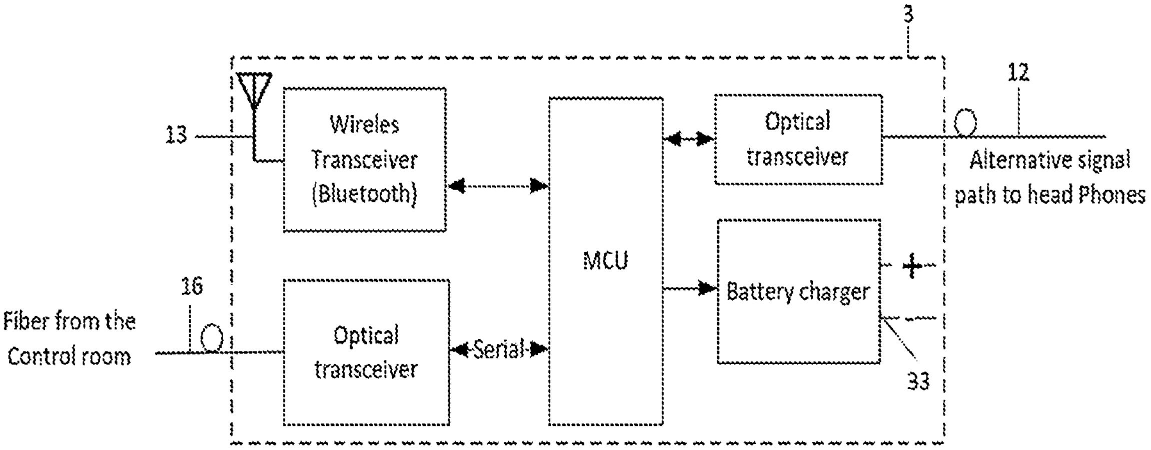
FIG. 3 shows a magnetic room interface unit of the MRI audio system.

FIG. 3 illustrates in detail the magnetic room interface unit 3 of the MRI audio system. The magnetic room interface unit (MIU) 3 serves a wireless access point inside the magnetic room 5. The wireless access point can serve several bidirectional voice channels. The patient channel is used for patient communication, the personal channel is used for communicating with personnel. The different voice channels can be broadcasted to all channels or unicasted to a single channel. The operator inside the operator room 10 has the possibility to select the recipient(s) for the different channels. Signals are sent to and from the control room 10 via optical fiber(s) 16. The magnetic room interface unit (MIU) 3 can also serve as a charging unit (having a battery charger) for the headphones 4 (i.e. the rechargeable battery/batteries within the shielded box 9 for the headphones 4). When the battery/batteries for the headphones 4 need to be recharged, the box 9 with its charging terminals (not shown) will be placed in this MIU unit 3 with its charging terminals 33 (see: +/− on FIG. 3), where the MIU 3 is positioned outside the 20 mT safety line of the MRI scanner, i.e. in a safe distance from the MRI magnet bore 7.

Audio signals from the operator room 10 are transferred via the optical fiber 16 to the MIU 3. At least one optical transceiver in FIG. 3, converts between optical and electrical signals. The audio signals are then transferred inside the MR room 5 to the headphones 4 via a wireless interface (wireless transceiver) having the RF antenna 13, or optionally via second fiber 12 interface. The magnetic room interface unit 3 further comprises a microcontroller unit (MCU) configured for controlling said magnetic room interface unit 3 as well as for audio and/or data control. Each of said at least one optical transceiver can be connected to a serial interface on the microcontroller unit (MCU) in order to transfer control and audio data.

Figure 4:
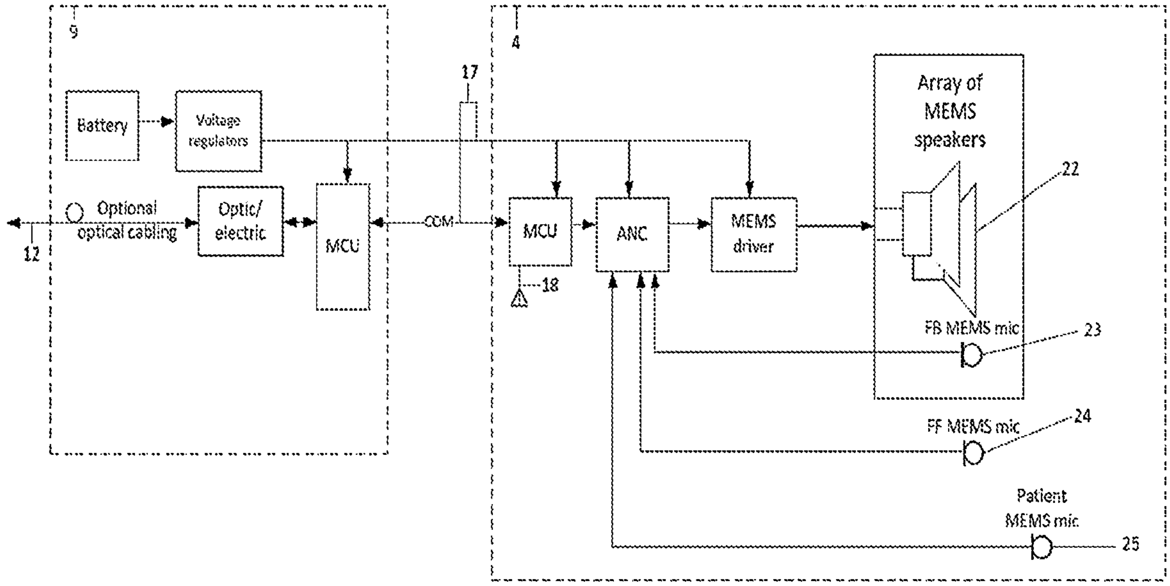
FIG. 4 shows how a shielded battery box and the MRI headphones of the MRI audio system is functioning.

FIG. 4 shows in detail how the headphones 4 are functioning together with the shielded box 9. The shielded battery box 9, that also serves as the interface for the optional optical fiber 12, is connected via a relatively short cable 17 to the left and right earmuffs of the headphones 4. The cable 17 may be connected to one or both earmuffs. The battery box 9 will convert, with the help of at least one voltage regulator, the battery voltage to voltage(s) needed by a MCU in the battery box 9 and by the electronics (such as e.g. MCU, ANC and MEMS driver) in the earmuffs of the headphones 4.

Audio is transmitted (received and/or sent) via the wireless interface 18, 13, or optionally via the fiber interface 12. In the other direction signals from the patient's 8 microphone 25 will be processed by the microcontroller unit (MCU) and sent either to the wireless transceiver or the optical transceiver of said magnetic room interface unit 3.

Due to the strong magnetic field inside the MRI magnet bore 7 it is not possible to use ferromagnetic materials. The traditional electrodynamic loudspeaker contains a magnet and cannot be used inside the MRI magnet bore 7.

This design will use an array of non-magnetic MEMS speakers 22 to generate sound waves. MEMS (microelectromechanical systems) is a technology where mechanical elements and electronics are implemented on a silicon substrate level. MEMS microphones has existed for some time, but MEMS loudspeakers are a new technology having been available commercially for only a few years. A single MEMS speaker element has a limited ability to move air and can therefore only be used for in-ear applications. To compensate for the limited sound pressure level (SPL) from a single element, multiple MEMS elements 22 can be placed in parallel.

The MRI audio system will implement a circumaural (over-ear) headphones 4. In the forward direction the audio signal is received via the optical fiber cable 12, or the wireless interface 18, 13. A microcontroller unit will decode the protocol and extract audio data and send it forward to an Active Noise Cancellation (ANC) unit. This ANC device will use the input from a feedforward microphone (FF mic) 24 and a feedback microphone (FB mic) 23 to reshape the audio signal. The FF mic 24 will record the ambient noise signal. The FB mic 23 will record the passively attenuated ambient noise signal together with the audio signal (from the array of non-magnetic MEMS speakers 22 in parallel). The ambient noise signal can be combined in opposite phase with the audio signal to reduce the ambient noise. The passively attenuated ambient noise together with the audio signal can be combined with the audio signal alone to reduce the ambient noise signal.

Figure 5A:
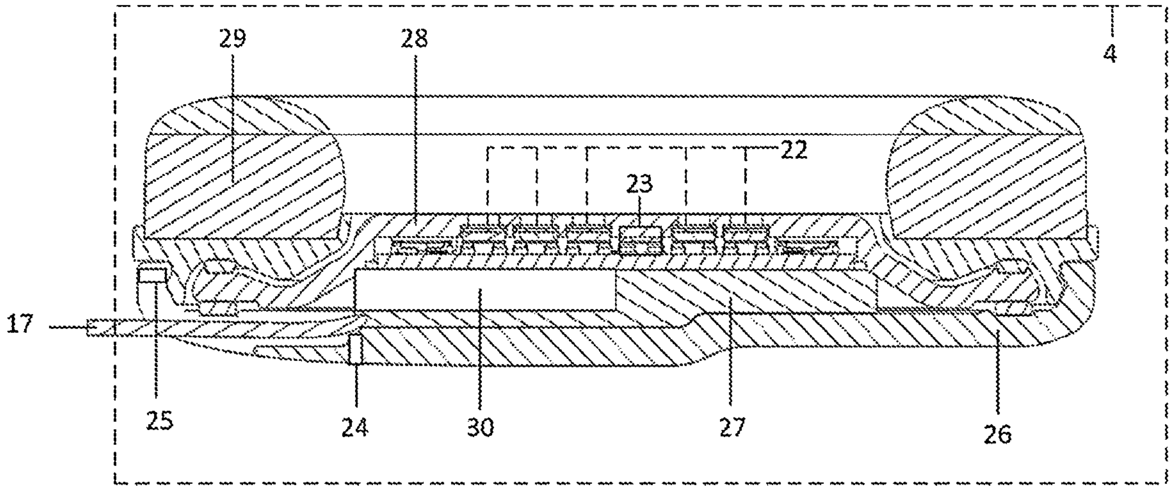
FIG. 5A shows MRI headphones in the MRI audio system based on MEMS elements.

FIG. 5A illustrates the MRI headphones 4 of the MRI audio system based on non-magnetic MEMS elements. The headphones 4 will fit into commonly used head coils from the main OEMs (original equipment manufacturers) and give at least 30 dB SNR (Single Number Rating) noise attenuation during common MRI sequences. The product will be used for both research and clinical fMRI and MRI applications. The headphones 4 consist of 2 earmuffs connected with a headband. Each earmuff consists of a rigid cup 26 providing passive attenuation and acting as a holder for the MEMS array 22, the circuit board 30 for the speaker drivers and Active Noise Cancelling circuits and a fixation for the headband. On each rigid cup 26 of each earmuff of the headphones 4 an earpad 29 can be arranged thus providing some space for the patient's 8 ear. Inside the cup 26 there is a liner 27 that can be made of an acoustic absorptive material for providing further passive noise attenuation. A MEMS holder plate 28, combined with sealings 31 in front of each individual MEMS speaker element 22, is providing a pressure tight separation between a front volume of the MEMS speakers 22 and a back volume required for the MEMS speakers 22 to generate adequate sound pressure level. The front volume of each individual MEMS speaker element 22 is the total volume of air provided for the patient's 8 ear being the space within the cup 26 that is arranged between the driver with the speakers 22 and the patient's 8 ear, wherein this space/front volume is closed (i.e. sealed by the patient and the earpad 29 to be virtually/practically airtight). The back volume of each individual MEMS speaker element 22 is the volume of air behind the driver with MEMS speaker elements 22 and facing the liner 27 that is arranged on the cup 26.

Figure 5B:
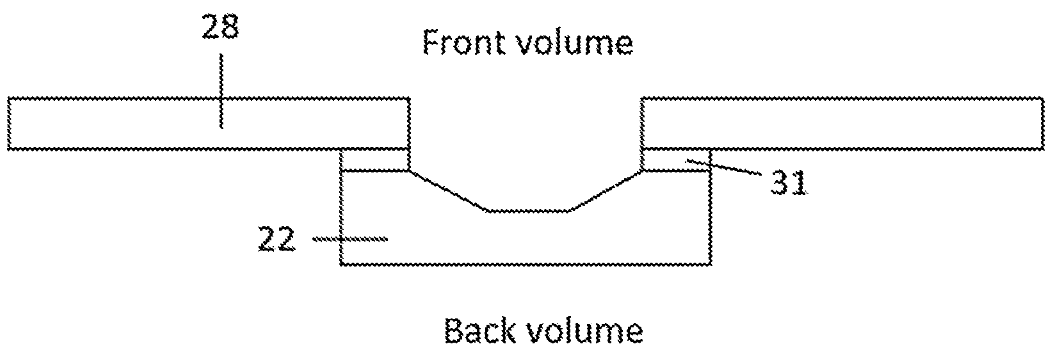
FIG. 5B is a blown-up/enlarged view of a part from FIG. 5A showing one MEMS element arranged with sealings on a holder or speaker plate.

FIG. 5B is a blown-up/enlarged view of a certain part from FIG. 5A showing one of the MEMS elements 22 arranged on the holder or speaker plate 28 by means of the sealings 31. The front and back volumes are also shown on FIG. 5B.

The headphones 4 are battery powered from the shielded box 9. The battery can be rechargeable and must operate inside the strong magnetic field of the MRI magnet bore 7. Battery and part of the electronics will be placed in the fully shielded box 9 to ensure no generation of RF noise influencing the MR images or that components are influenced by the RF, static or gradient magnetic field. A DC voltage bias must be available for the MEMS elements. This DC voltage can be achieved by connecting multiple battery cells in series and/or increasing the voltage from the battery/batteries using one or multiple DC/DC converters.

Design of hearing protection must utilize materials and geometries providing passive noise cancellation. When utilizing a slim form factor in a headphone design, active noise cancellation becomes essential to attenuate sound in frequencies below 1 kHz.

During the MRI examination, the MRI machine/scanner may produce sound pressure level of more than about 120 dB. The MRI audio system aims to provide an attenuation of at least about 30 dB SNR (Single Number Rating). This will be achieved by a combination of passive and active noise cancellation. The active noise cancellation uses two microphones 23, 24. One microphone 23 inside the earmuff close to the patient ear for recording the same sound as heard by the patient 8. The second microphone 24 will be placed outside the headphones 4 and will record the surrounding noise. The two microphones 23, 24 used in said ANC can be MEMS microphones. An ANC chip on the circuit board 30 will use these two signals and the applied sound to construct a sound signal that will reduce the noise part of the signal heard by the patient 8. The patient microphone 25 should be positioned inside the cup 26 and in the proximity of the patient's 8 mouth.

Additional modifications, alterations and adaptations of the present invention will suggest themselves to those skilled in the art without departing from the scope of the invention as defined in the following patent claims.

The invention claimed is:

1. An audio system configured for magnetic resonance imaging (MRI), the MRI audio system comprising:

at least one audio source placed in a control room;

a control room interface unit placed in the control room and configured for at least one of: wireless and cabled interconnection and communication with said at least one audio source;

a magnetic room interface unit placed in a magnetic room, the entire magnetic room being shielded by a metal shield arranged inside the magnetic room;

an optical cable comprising at least one optical fiber and arranged within a waveguide having a relatively small diameter compared to its length thus providing high attenuation for electromagnetic waves, wherein the waveguide is connecting the magnetic room and the control room and comprises said at least one optical fiber of the optical cable, and wherein the optical cable connects the control room interface unit and the magnetic room interface unit in such a manner that the metal shield of the magnetic room will not be penetrated;

a shielded box; and a set of headphones configured for use by a patient to be subject to an MRI examination;

wherein the shielded box is connected to the headphones via a shielded cable configured for transfer of signaling between the shielded box and the headphones, the shielded box comprising at least one battery for supplying energy to the headphones via the shielded cable;

wherein the magnetic room interface unit is interconnected with the shielded box for mutual communication by means of at least one of: i) wireless communication via an RF antenna of the magnetic room interface unit and an RF antenna for the headphones with the shielded box and ii) an optical cable connecting the magnetic room interface unit and the shielded box; and wherein the headphones comprise an array of non-magnetic MEMS speaker elements placed in parallel and arranged within a cup of the headphones.

2. The MRI audio system according to claim 1, wherein the headphones further comprise at least one MEMS microphone positioned inside the cup in proximity to the patient's mouth.

3. The MRI audio system according to claim 1, wherein the control room interface unit is interconnected with said at least one audio source for mutual communication by means of at least one of: i) wireless communication via an RF antenna of the control room interface unit and ii) wired connection by means of a cable connecting the control room interface unit and said at least one audio source.

4. The MRI audio system according to claim 3, wherein the wireless communication between the control room interface unit and said at least one audio source is wireless communication via at least one wireless transceiver.

5. The MRI audio system according to claim 1, wherein the magnetic room interface unit further comprises a charging unit configured for charging said at least one battery of the shielded box for supplying energy to the headphones, said at least one battery being rechargeable.

6. The MRI audio system according to claim 1, wherein the metal shield arranged inside the magnetic room is a Faraday cage.

7. The MRI audio system according to claim 1, wherein the headphones further comprise: a feedforward microphone placed on the outside of the headphones and positioned not to be obstructed by the head coil and configured to record the surrounding noise in the MR room, and a feedback microphone arranged inside an earmuff of the headphones and close to the patient's ear and configured for recording at least one of: i) the sound presented to the patient and ii) the sound heard by the patient.

8. A set of headphones configured for use in a magnetic resonance imaging (MRI) audio system and for use by a patient to be subject to a magnetic resonance imaging (MRI) examination, wherein the set of headphones comprises:

left and right earmuffs, each comprising a rigid cup providing passive attenuation;

a headband connecting the two earmuffs;

a shielded box connected to one or both of the two earmuffs by a shielded cable and configured for accommodating therein at least one battery for supplying energy to the headphones via the shielded cable;

at least one RF antenna arranged inside the earmuffs and configured for receiving and sending audio wirelessly to and from a magnetic room interface unit; and an array of MEMS speaker elements placed in parallel and arranged within the cup of the headphones, wherein each cup is configured for acting as a holder for the array of MEMS speaker elements, a circuit board (30) for speaker drivers and Active Noise Cancelling circuits and a fixation for the headband.

9. The set of headphones according to claim 8, further comprising at least one MEMS microphone for patient voice positioned inside the cup in proximity to the patient's mouth, wherein the headphones comprise a feedforward microphone positioned so that it is not obstructed by the head coil and configured to record the noise in the MR room and a feedback microphone configured for recording the sound presented to the patient and positioned inside an earmuff.

10. The set of headphones according to claim 8, wherein the headphones are over-ear headphones.

* * * * *